US011588598B2

(12) United States Patent
Lee et al.

(10) Patent No.: US 11,588,598 B2
(45) Date of Patent: *Feb. 21, 2023

(54) SYSTEM FOR TRANSMITTING REFERENCE SIGNAL WITH INFORMATION ON STATE OF CHANNEL

(71) Applicant: Electronics and Telecommunications Research Institute, Daejeon (KR)

(72) Inventors: Hee Soo Lee, Daejeon (KR); Tae Gyun Noh, Daejeon (KR); Jae Young Ahn, Daejeon (KR); Kyoung Seok Lee, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/225,136

(22) Filed: Apr. 8, 2021

(65) Prior Publication Data

US 2021/0226753 A1 Jul. 22, 2021

Related U.S. Application Data

(63) Continuation of application No. 13/235,845, filed on Sep. 19, 2011, now Pat. No. 10,979,185, which is a
(Continued)

(30) Foreign Application Priority Data

Mar. 18, 2009 (KR) .......................... 10-2009-0023257
Mar. 20, 2009 (KR) .......................... 10-2009-0024128
(Continued)

(51) Int. Cl.
*H04L 5/00* (2006.01)
*H04B 7/26* (2006.01)
(Continued)

(52) U.S. Cl.
CPC .......... *H04L 5/0048* (2013.01); *H04B 7/2606* (2013.01); *H04L 5/0091* (2013.01); *H04W 72/042* (2013.01); *H04W 84/047* (2013.01)

(58) Field of Classification Search
CPC . H04L 5/0048; H04L 5/0091; H04L 25/0224; H04B 7/2606; H04W 72/042; H04W 84/047
See application file for complete search history.

(56) References Cited

U.S. PATENT DOCUMENTS 7,492,699 B2   2/2009  Cho
7,804,792 B2 *  9/2010  Choi ..................... H04L 1/0027
                                                  370/278
(Continued)

FOREIGN PATENT DOCUMENTS

EP    2244393 A      10/2010
EP    2244393 A2 *   10/2010  .......... C08G 59/3245
(Continued)

OTHER PUBLICATIONS

Kwon et al. U.S. Appl. No. 61/113,233, filed Nov. 11, 2008.
(Continued)

*Primary Examiner* — Wutchung Chu
(74) *Attorney, Agent, or Firm* — Insight Law Group, PLLC; Seung Lee

(57) ABSTRACT

A reference signal (RS) transmission system to transmit a channel state information (CSI) RS for extraction of CSI to a relay and a macro terminal is disclosed. The base station transmits information on a sub frame containing the CSI RS to the relay or the macro terminal. The macro terminal and the relay receive the CSI RS using the information on the sub frame. The macro terminal and the relay extract the CSI using the CSI RS and transmit the extracted CSI to the base station.

18 Claims, 9 Drawing Sheets

Related U.S. Application Data continuation of application No. PCT/KR2010/001696, filed on Mar. 18, 2010.

(30) Foreign Application Priority Data

Mar. 23, 2009 (KR) .................. 10-2009-0024275
Oct. 7, 2009 (KR) .................. 10-2009-0094999

(51) Int. Cl.
*H04W 72/04* (2023.01)
*H04W 84/04* (2009.01)

(56) References Cited

U.S. PATENT DOCUMENTS

| | | | |
|---|---|---|---|
| 8,116,270 B2* | 2/2012 | Heo | H04L 1/0068 370/329 |
| 8,150,411 B2* | 4/2012 | Fischer | H04W 28/18 455/68 |
| 8,451,862 B2 | 5/2013 | Huang et al. | |
| 8,619,756 B2 | 12/2013 | Das et al. | |
| 8,831,045 B2 | 9/2014 | Kim et al. | |
| 8,913,531 B2 | 12/2014 | Kwon et al. | |
| 8,937,875 B2* | 1/2015 | Hoshino | H04B 7/0486 370/252 |
| 9,647,810 B2* | 5/2017 | Nam | H04L 5/0048 |
| 10,359,499 B2* | 7/2019 | Zhang | H04W 72/1247 |
| 2003/0207696 A1 | 11/2003 | Willenegger et al. | |
| 2004/0085936 A1 | 5/2004 | Gopalakrishnan et al. | |
| 2004/0142698 A1 | 7/2004 | Pietraski | |
| 2004/0190447 A1 | 9/2004 | Dacosta | |
| 2004/0266339 A1 | 12/2004 | Larsson | |
| 2005/0191965 A1 | 9/2005 | Yu et al. | |
| 2006/0014542 A1* | 1/2006 | Khandekar | H04L 5/006 455/447 |
| 2006/0116080 A1 | 6/2006 | Eom | |
| 2006/0120470 A1 | 6/2006 | Hwang et al. | |
| 2006/0209671 A1 | 9/2006 | Khan et al. | |
| 2006/0285505 A1 | 12/2006 | Cho et al. | |
| 2007/0155392 A1 | 7/2007 | Cho et al. | |
| 2007/0167160 A1 | 7/2007 | Asanuma et al. | |
| 2007/0202882 A1 | 8/2007 | Ju et al. | |
| 2007/0248113 A1 | 10/2007 | Ko et al. | |
| 2007/0286066 A1 | 12/2007 | Zhang et al. | |
| 2007/0293233 A1* | 12/2007 | Inoue | H04L 5/0048 455/450 |
| 2008/0049813 A1 | 2/2008 | Kurose et al. | |
| 2008/0075007 A1 | 3/2008 | Mehta et al. | |
| 2008/0080436 A1 | 4/2008 | Sandhu et al. | |
| 2008/0107091 A1 | 5/2008 | Ramachandran | |
| 2008/0107158 A1 | 5/2008 | Yoshii et al. | |
| 2008/0165719 A1 | 7/2008 | Visotsky | |
| 2008/0205323 A1 | 8/2008 | Kaneko et al. | |
| 2008/0205364 A1 | 8/2008 | Park et al. | |
| 2008/0207117 A1 | 8/2008 | Lim et al. | |
| 2008/0220790 A1 | 9/2008 | Cai et al. | |
| 2008/0220791 A1 | 9/2008 | Cho et al. | |
| 2008/0227461 A1 | 9/2008 | Dayal et al. | |
| 2008/0232296 A1 | 9/2008 | Shin et al. | |
| 2008/0247340 A1 | 10/2008 | Choi et al. | |
| 2008/0285477 A1 | 11/2008 | Kuroda et al. | |
| 2008/0305819 A1 | 12/2008 | Chun et al. | |
| 2009/0067374 A1 | 3/2009 | Yoon et al. | |
| 2009/0075596 A1* | 3/2009 | Gorokhov | H04W 16/04 455/62 |
| 2009/0122777 A1 | 5/2009 | Tao et al. | |
| 2009/0147728 A1 | 6/2009 | Atia et al. | |
| 2009/0163144 A1 | 6/2009 | Nakatsugawa | |
| 2009/0186645 A1 | 7/2009 | Jaturong et al. | |
| 2009/0190537 A1 | 7/2009 | Hwang et al. | |
| 2009/0207799 A1 | 8/2009 | Mazzarese | |
| 2009/0245212 A1 | 10/2009 | Sambhwani et al. | |
| 2009/0252077 A1* | 10/2009 | Khandekar | H04L 5/005 370/312 |
| 2009/0257390 A1* | 10/2009 | Ji | H04W 72/082 370/329 |
| 2009/0268624 A1 | 10/2009 | Imamura et al. | |
| 2010/0008287 A1 | 1/2010 | Lin et al. | |
| 2010/0015923 A1 | 1/2010 | Golitschek | |
| 2010/0070139 A1* | 3/2010 | Ohshima | B62D 15/028 701/42 |
| 2010/0080139 A1 | 4/2010 | Palanki et al. | |
| 2010/0080166 A1* | 4/2010 | Palanki | H04B 7/15557 370/329 |
| 2010/0080269 A1* | 4/2010 | Kim | H04L 27/2613 375/211 |
| 2010/0110964 A1* | 5/2010 | Love | H04W 72/1278 370/312 |
| 2010/0165931 A1* | 7/2010 | Nimbalker | H04L 5/0053 370/329 |
| 2010/0172311 A1* | 7/2010 | Agrawal | H04L 5/0082 370/329 |
| 2010/0189045 A1* | 7/2010 | Takeshita | H04W 72/1278 370/329 |
| 2010/0202396 A1 | 8/2010 | Won et al. | |
| 2010/0220618 A1 | 9/2010 | Kwon et al. | |
| 2010/0232345 A1 | 9/2010 | Tsai et al. | |
| 2010/0238821 A1* | 9/2010 | Liu | H04B 7/024 370/252 |
| 2010/0238845 A1* | 9/2010 | Love | H04W 72/1263 370/280 |
| 2010/0238877 A1* | 9/2010 | Nam | H04L 5/0026 370/329 |
| 2010/0322100 A1* | 12/2010 | Wan | H04J 11/0093 370/252 |
| 2011/0019637 A1 | 1/2011 | Ojala et al. | |
| 2011/0038285 A1* | 2/2011 | Kwon | H04W 72/042 370/281 |
| 2011/0170622 A1 | 7/2011 | Nakayama | |
| 2011/0222411 A1 | 9/2011 | Koskinen et al. | |
| 2011/0237270 A1 | 9/2011 | Noh et al. | |
| 2011/0267997 A1 | 11/2011 | Seo et al. | |
| 2011/0299449 A1* | 12/2011 | Kwon | H04L 5/0023 370/312 |
| 2011/0317581 A1* | 12/2011 | Hoshino | H04L 5/0048 370/252 |
| 2011/0317616 A1* | 12/2011 | Seo | H04B 7/2656 370/315 |
| 2012/0009959 A1* | 1/2012 | Yamada | H04L 25/0226 455/507 |
| 2012/0039232 A1 | 2/2012 | Kwon et al. | |
| 2012/0134316 A1* | 5/2012 | Seo | H04W 72/04 370/315 |
| 2012/0170485 A1 | 7/2012 | Maeda et al. | |
| 2013/0208681 A1 | 8/2013 | Gore et al. | |
| 2017/0104519 A1* | 4/2017 | Park | H04L 5/0094 |

FOREIGN PATENT DOCUMENTS

| | | |
|---|---|---|
| KR | 1020060055215 A | 5/2006 |
| KR | 1020090053599 A | 5/2009 |
| WO | 07/145035 A1 | 12/2007 |
| WO | 08/026256 A1 | 3/2008 |
| WO | 08/098223 A2 | 8/2008 |

OTHER PUBLICATIONS

3GPP TS 36.211 V8.5.0, "3rd Generation Partnership Project; Technical Specification Group Radio Access Network; Evolved Universal Terrestrial Radio Access (E-UTRA); Physical Channels and Modulation (Release 8)," 3GPP, 4 pages (2008).

3GPP TSG-RAN WG1 #56, "Way forward on downlink reference signals for LTE-A," R1-091066, 2 pages (2009).

Ojala et al. (U.S. Appl. No. 61/039,609), filed Mar. 26, 2008.

International Search Report and Written Opinion for Application No. PCT/KR2010/001696, dated Oct. 19, 2010.

Ericsson, "Efficient support of relays through MBSFN subframes," TSG-RAN WG 1 #55, R 1-084357, 3 pages, (2008).

(56) References Cited

OTHER PUBLICATIONS

Motorola, "Common Reference Symbol Mapping/Signaling for 8 Transit Antennas," 3GPP TSG RAN1 #54, R1-083224, 5 pages, (2008).
Nortel, "Control Channel and Data Channel Design for Relay Link in LTE-Advanced," 3GPP TSG-RAN Working Group 1 Meeting #56, R1-090753, 9 pages, (2009).
Huawei, "Relay frame structure design of TDD mode," 3GPP TSG RAN WG1 Meeting #56bis, R1-091270, 10 pages, (2009).
Texas Instruments, "Common Reference Symbol Mapping/Signaling for 8 Transmit Antenna," 3GPP TSG RNA1 #54bis, R1-083532, 6 pages, (2008).
ZTE, "Redundant signaling overhead on MSAP," 3GPP TSG RAN WG2 #64Bis, Tdoc R2-090733, 8 pages, (2008).
Supplementary European Search Report for Application No. 10753717.7, 2 pages, dated Jul. 20, 2012.

* cited by examiner

FIG. 4
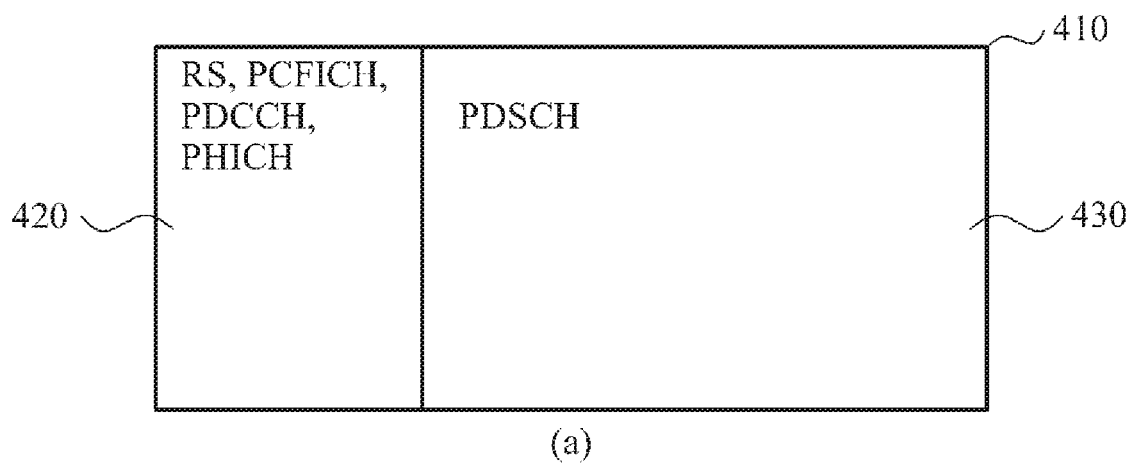
(a)
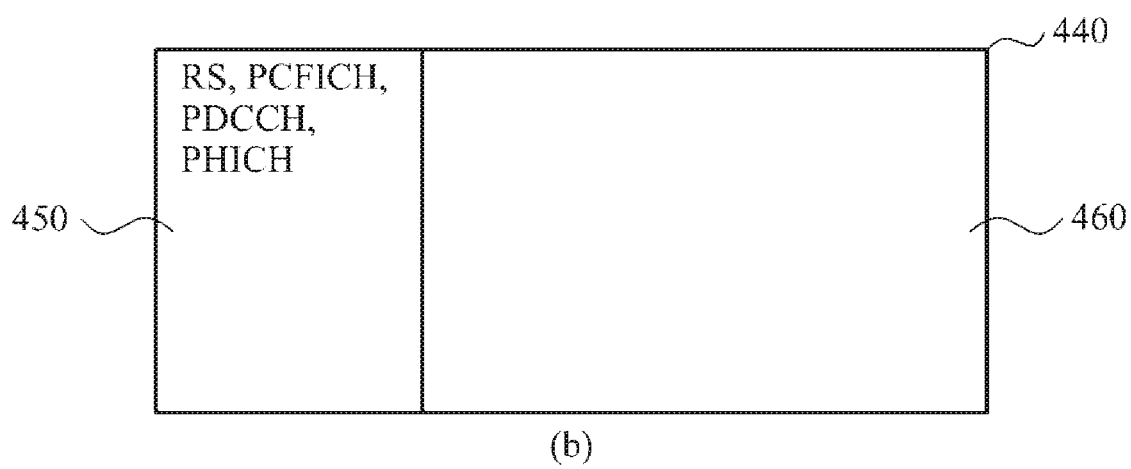
(b)

SYSTEM FOR TRANSMITTING REFERENCE SIGNAL WITH INFORMATION ON STATE OF CHANNEL

RELATED APPLICATIONS

This application is a continuation of U.S. application Ser. No. 13/235,845 filed on Sep. 19, 2011, which is a continuation of PCT Application No. PCT/KR2010/001696 filed on Mar. 18, 2010, which claims priority to, and the benefit of, Korean Patent Application No. 10-2009-0023257 filed Mar. 18, 2009, Korean Patent Application No. 10-2009-0024128 filed Mar. 20, 2009, Korean Patent Application No. 10-2009-0024275 filed Mar. 23, 2009, and Korean Patent Application No. 10-2009-0094999 filed Oct. 7, 2009. The contents of the aforementioned applications are hereby incorporated by reference in their entirety.

BACKGROUND

The present invention relates to a reference signal (RS) necessary for data transmission and reception and to signaling of the RS, and more particularly, to an RS signal for data transmission and reception between a base station and a relay in a wireless communication system using the relay and signaling of the RS.

An appropriate reference signal (RS) needs to be transmitted for efficient transmission and reception of data. The RS is necessary for modulation of data and also for generation of channel state information (CSI) through estimation of a channel state between a base station and a terminal. The terminal generates CSI and transmits the CSI to the base station. The base station transmits data to the terminal based on the CSI. An RS used to extract the CSI may be referred to as a 'CSI RS.'

A plurality of RSs are necessary in general for multiple input multiple output (MIMO) transmission and reception. Exemplarily, the RSs transmitted by the base station are orthogonal to one another. The base station transmits its own specific RS to all terminals in the coverage. In general, as the number of antennas installed in the base station increases, more RSs are necessary.

SUMMARY

An aspect of the present invention provides a method to transmit a channel state information (CSI) reference signal (RS) for data transmission between a base station and a relay in a system which uses the relay.

According to an aspect of the present invention, there is provided a base station which transmits sub frames to a terminal and a relay, including a channel state information (CSI) reference signal (RS) pattern information transmission unit to transmit information on a sub frame which contains a CSI RS among the sub frames to the terminal or the relay; and a transmission unit to transmit the CSI RS and data to the terminal or the relay with reference to the information on the sub frame.

According to an aspect of the present invention, there is provided a relay including a CSI RS pattern information reception unit to receive, from a base station, information on a sub frame which contains a CSI RS; a reception unit to receive the CSI RS from the base station with reference to the information on the sub frame; a CSI extraction unit to extract CSI between the base station and the relay using the CSI RS; and a feedback unit to transmit the extracted CSI to the base station.

According to an aspect of the present invention, there is provided a terminal including a CSI RS pattern information reception unit to receive, from a base station, information on a sub frame which contains a CSI RS; a reception unit to receive the CSI RS from the base station with reference to the information on the sub frame; a CSI extraction unit to extract CSI between the base station and the relay using the CSI RS; and a feedback unit to transmit the extracted CSI to the base station.

According to the embodiments of the present invention, the CSI RS for data transmission between the base station and the relay in a system using a relay may be efficiently transmitted.

BRIEF DESCRIPTION OF DRAWINGS

FIG. 4 is a view showing the structures of sub frames of a base station and a relay in a case where the relay receives data transmitted by the base station;

DESCRIPTION OF EMBODIMENTS

Figure 1:
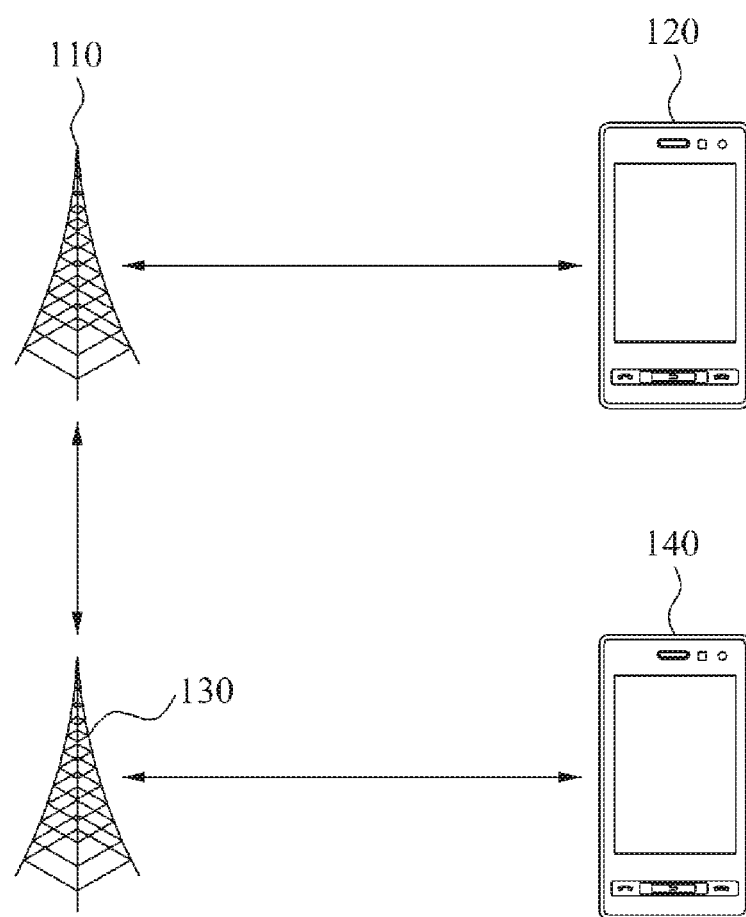
FIG. 1 is a view for describing a reference signal (RS) transmission system.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a view for describing a reference signal (RS) transmission system according to an embodiment of the present invention.

The RS transmission system includes a base station 110, a relay 130, a macro terminal 120, and a relay terminal 140. The macro terminal 120 receives data directly from the base station 110 by connecting directly with the base station 110. The relay terminal 140 connects with the relay 130 and receives data from the relay 130. The relay 130 receives data from the base station 110 and forwards the received data to the relay terminal 140.

The RS transmission system also includes an uplink and a downlink between the base station 110 and the terminal 120, an uplink and a downlink between the base station 110 and the relay 130, and an uplink and a downlink between the relay 130 and the relay terminal 140. In the RS transmission system, the six links need to efficiently allocate and use limited system resources.

Figure 2:
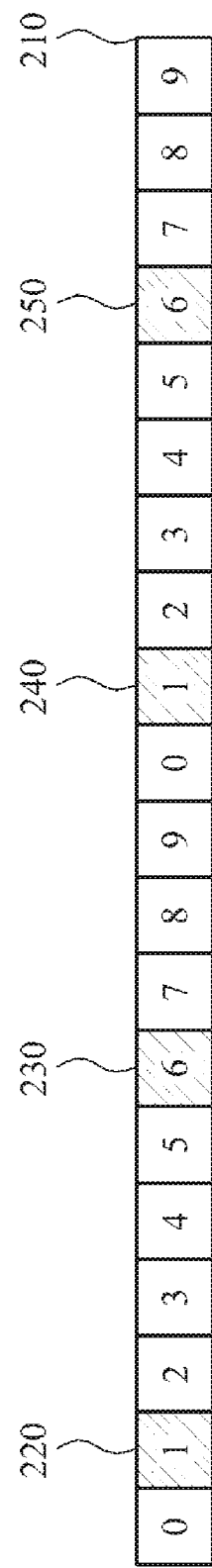
FIG. 2 is a view showing a multicast broadcast single frequency network (MBSFN) sub frame according to an embodiment of the present invention.

FIG. 2 is a view showing a multicast broadcast single frequency network (MBSFN) sub frame according to an embodiment of the present invention.

The relay 130 informs, by a signal, terminals that a sub frame used for reception of a signal from the base station 110 is the MBSFN sub frame.

As shown in FIG. 2, each of frames 210 may include ten sub frames. The relay 130 may designate first frames and sixth frames 220, 230, 240, and 250 of the frames 210 as the MBSFN sub frames. The relay 130 may receive data from the base station 110 using the MBSFN sub frames 220, 230, 240, and 250 and forward data to the relay terminal 140 using sub frames other than the MBSFN sub frames 220, 230, 240, and 250.

Figure 3:
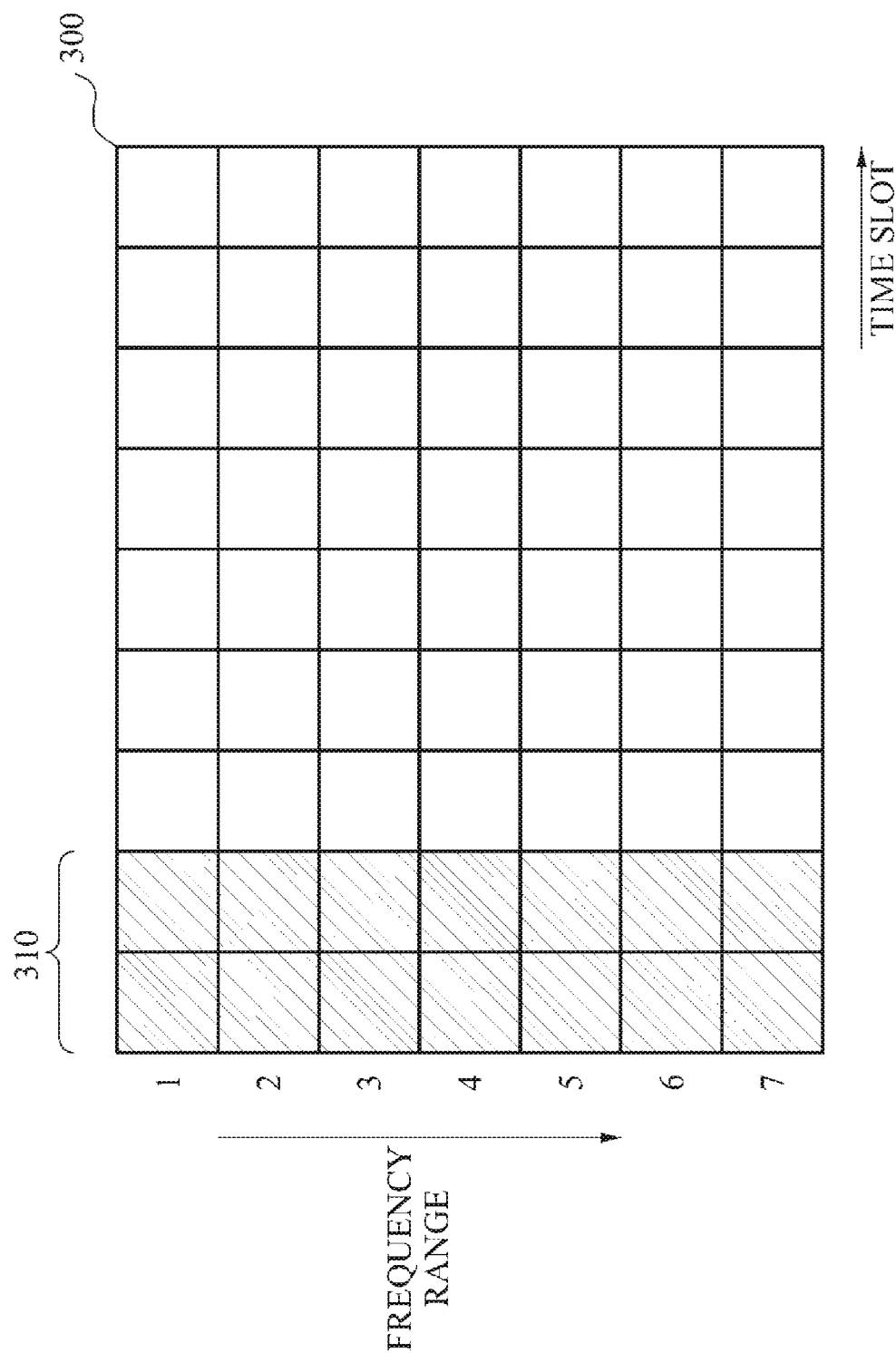
FIG. 3 is a view showing the structure of the MBSFN sub frame according to the embodiment.

FIG. 3 is a view showing the structure of the MBSFN sub frame according to the embodiment.

In FIG. 3, a horizontal axis denotes an elapse of time while a vertical axis denotes a frequency range. A sub frame 300 signaled as the MBSFN sub frame to receive data from the base station may transmit control signals using part of symbols 310 located at a front portion of the sub frame 300. Here, the control signals may include an RS, a physical control format indicator channel (PCFICH), a physical downlink control channel (PDCCH), and a Physical H-ARQ Indicator Channel (PHICH). The relay receives signals from the base station using the other slots of the sub frame 300.

FIG. 4 shows the structures of the sub frames of the base station and of the relay in a case where the relay receives data transmitted by the base station.

Part (a) of FIG. 4 shows the structure of a downlink sub frame 410 transmitted by the base station 110 to the macro terminal 120 and the relay 130.

The sub frame 410 includes a control signal region 420 and data regions 430. The base station 110 may transmit the RS, the PCFICH, the PDCCH, and the PHICH using the control signal region 420 and transmit a physical downlink shared channel (PDSCH) using the data region 430. The control signal region 420 may consist of the symbols of the front part of the sub frame as shown in FIG. 3.

Part (b) of FIG. 4 shows the structure of a downlink sub frame 440 transmitted by the relay 130 to the relay terminal 140. The relay 130 provides a signal that the downlink sub frame 440 corresponding to the sub frame 410 of the base station 110 is the MBSFN sub frame. The downlink sub frame 440 set to receive a signal from the base station includes a control signal region 450 and a reception region 460. The relay 130 may transmit the RS, the PCFICH, the PDCCH, and the PHICH using the control signal region 450 for the relay 140 that receives data from the relay 130. The relay 130 receives data from the base station 110 but does not transmit data to the relay terminal 140 for a time corresponding to the reception region 460.

Figure 5:
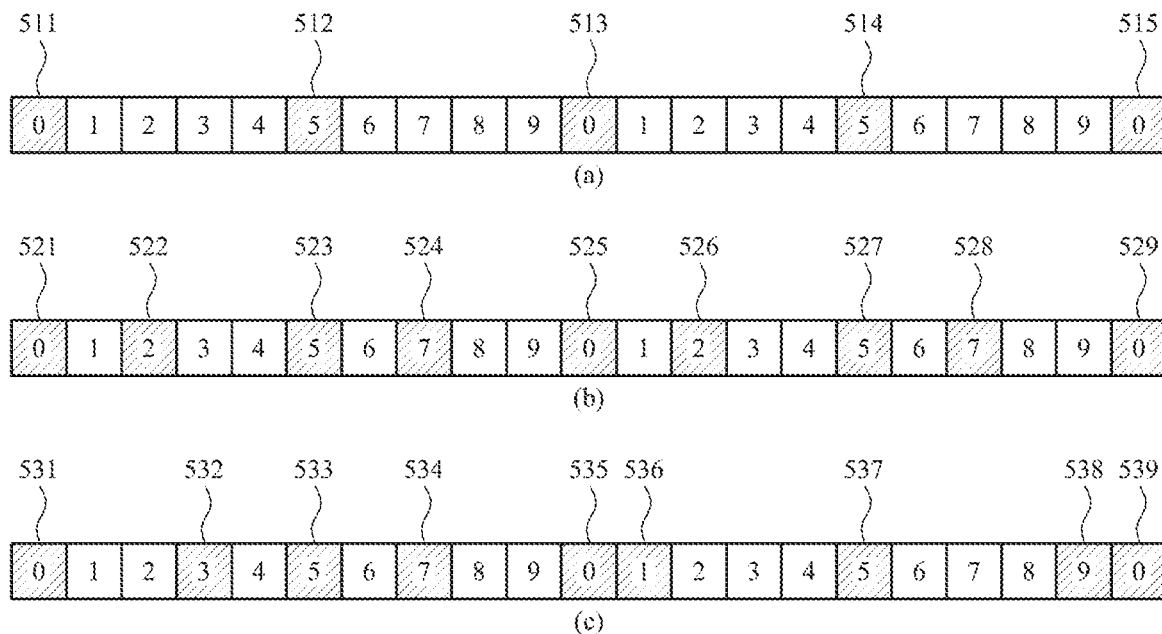
FIG. 5 is a view showing sub frames containing an RS according to an embodiment of the present invention.

FIG. 5 shows sub frames containing a CSI RS according to an embodiment of the present invention.

The CSI RS may not be contained in all sub frames. In other words, only some of the sub frames transmitted by the base station 110 to the macro terminal 120 or the relay 130 may include the CSI RS. The macro terminal 120 or the relay 130 receives the CSI RS and estimates a state of channel between the base station 110 and the macro terminal 120 or between the base station 110 and the relay 130 using the CSI RS.

Since not all the sub frames contain the CSI RS, the macro terminal 120 and the relay 130 need to be aware of which sub frame contains the CSI RS. That is, the macro terminal 120 and the relay 130 need to be aware of a transmission pattern of the CSI RS.

The base station 110 informs the macro terminal 120 and the relay 130 of the transmission pattern of the CSI RS by signals. Therefore, the macro terminal 120 and the relay 130 may receive the CSI RS from the base station 110 based on the transmission pattern.

According to an embodiment, the base station 110 may periodically transmit the CSI RS. For example, all the base stations may have the same CSI RS transmission period. All the base stations may transmit the CSI RS using different sub frames and using cell specific offsets while transmitting the CSI RS by the same transmission period. In this case, the CSI RS pattern information may include the CSI RS transmission period and offset.

Presuming that $\theta_a$ denotes an offset of a base station A and $n_f$ and $n_s$ denote a frame number and a sub frame number, respectively, the sub frame number may represent an order of a plurality of sub frames of a frame. The base station A may transmit the CSI RS only in a sub frame satisfying [Expression 1] below, wherein N denotes the number of sub frames included in one frame and $\Delta$ denotes the CSI RS transmission period.

$$\theta_a = (n_f * N + n_s) \bmod \Delta \qquad \text{[Expression 1]}$$

According to an embodiment, all the base stations may have the same or different offsets $\theta$. The offset $\theta$ and the CSI RS transmission period $\Delta$ may vary over time. The base station may transmit the offset $\theta$ to the macro terminal 120 and the relay 130. The macro terminal 120 and the relay 130 may receive the CSI RS based on the offset $\theta$ and the CSI RS transmission period $\Delta$.

Part (a) of FIG. 5 illustrates transmission of the CSI RS using the sub frames in a case where the offset $\theta$ is '0' and the CSI RS transmission period $\Delta$ is '5'. Sub frames 511, 512, 513, 514, and 515, hatched in the drawing, contain the CSI RS.

According to an embodiment, the base station 110 may transmit the CSI RS using a set of one or more uniform-spaced sub frames. For example, presuming that $S(\Delta,\theta)$ denotes a set of the uniform-spaced sub frames of which the transmission period is denoted by $\Delta$ and the offset is denoted by $\theta$, the base station 110 may transmit the CSI RS using the sub frames belonging to a union U of [Expression 2] below. In this case, the base station 110 informs the macro terminal 120 and the relay 130 of the CSI RS pattern information including one or more offsets. In other words, the CSI RS pattern information includes $(\theta_1, \theta_2, \theta_3, \ldots, \theta_N)$.

$$U = \bigcup_{i=1}^{N} S(\Delta, \theta_i) \qquad \text{[Expression 2]}$$

When there is an offset vector $(\theta_1, \theta_2, \theta_3, \ldots, \theta_N)$, the base station 110 transmits the CSI RS to the sub frames belonging to the set of [Expression 2].

Part (b) of FIG. 5 shows transmission of the CSI RS when an offset vector $\{\theta_1=0, \theta_2=2\}$ is provided. The transmission period corresponding to each element of the offset vector is '5'. Sub frames 521, 522, 523, 524, 525, 526, 527, 528, and 529, hatched in the drawing, contain the CSI RS.

According to an embodiment, the transmission period corresponding to each element of the offset vector may be different. That is, the base station 110 may transmit the CSI RS to sub frames belonging to a union U of [Expression 3] below with respect to a period vector $(\Delta_1, \Delta_2, \Delta_3, \ldots, \Delta_N)$ and an offset vector $(\theta_1, \theta_2, \theta_3, \ldots, \theta_N)$. In this case, the base station 110 may generate the CSI RS pattern information including at least one period and at least one offset and inform the macro terminal 120 and the relay 130 of the CSI RS pattern information by signals.

$$S(\Delta_1,\Delta_2,\Delta_3,\ldots,\Delta_N,\theta_1,\theta_2,\theta_3,\ldots,\theta_N) = \bigcup_{i=1}^{N} S(\Delta_i,\theta_i)$$ [Expression 3]

Part (c) of FIG. 5 shows transmission of the CSI RS in a case where a period vector is {5,4} and an offset vector is {$\theta_1$=0, $\theta_2$=3}. Hatched sub frames 531, 532, 533, 534, 535, 536, 537, 538, and 539 contain the CSI RS.

According to an embodiment, the period vector or the offset vector with respect to a plurality of the base stations may be equal or different.

According to an embodiment, the base station 110 may transmit a signal regarding the CSI RS transmission period $\Delta$ or the offset $\theta$ of the CSI RS to the macro terminal 120 or the relay 130 using a control channel (CCH).

According to an embodiment, the base station 110 may transmit those parameters to the macro terminal 120 and the relay 130 periodically or only when the parameters are changed.

According to an embodiment, in the case where the CSI RS is periodically transmitted, the system may be set so that the CSI RS is not transmitted to certain predetermined sub frames. For example, if the sub frames satisfy conditions disclosed below, the CSI RS may be not transmitted to the predetermined sub frames even when the predetermined sub frames correspond to the period for transmitting the CSI RS.

1) MBSFN sub frames designated for a multimedia broadcast multicast service (MBMS) service 2) downlink sub frames used as a backhaul link for data reception According to an embodiment, position information of the sub frames which are set to be not transmitted with the CSI RS may be transmitted to the macro terminal 120 and the relay 130 regardless of the period.

According to an embodiment, the base station 110 may inform the macro terminal 120 and the relay 130 of the MBSFN sub frames used by the MBMS service.

According to an embodiment, the base station 110 may inform the macro terminal 120 and the relay 130 of the downlink sub frames used as the backhaul link for data reception.

The CSI RS may be used for data transmission and reception between the base station 110 and the relay 130. Among the sub frames transmitted by the base station 110, the relay 130 may receive only specific sub frames allocated for a link between the base station 110 and the relay 130. Therefore, if there is no CSI RS in the sub frame allocated for the link between the base station 110 and the relay 130, the relay 130 receives no CSI RS. Accordingly, the base station 110 is limited in determining the sub frame to transmit the CSI RS.

According to an embodiment, the base station 110 may not be able to periodically allocate the sub frame to transmit the CSI RS. In this case, the sub frame to transmit the CSI RS may be determined and a position of the determined sub frame may be transmitted to the macro terminal 120 or the relay 130 using bitmap information. That is, the base station 110 transmits the information on the sub frame containing the CSI RS in the form of the bitmap to the macro terminal 120 or the relay 130. The bitmap information may represent whether each of the sub frames contains the CSI RS. For example, it may be considered that the sub frame corresponding to the bitmap information contains the CSI RS when a value of the bitmap information is '1' and does not contain the CSI RS when a value of the bitmap information is '0.' Here, the CSI RS pattern information may contain the bitmap information representing whether the CSI RS is transmitted.

According to an embodiment, the base station 110 may transmit an identifier list of the sub frame to transmit the CSI RS to the macro terminal 120 or the relay 130.

According to an embodiment, the base station 110 may transmit information on whether an (n+k)-th sub frame contains the CSI RS to the macro terminal 120 and the relay 130 using an n-th sub frame. Here, a value 'k' may be equal to or greater than '0' and be varied based on the base stations.

For example, the base station 110 may transmit the information on whether the (n+k)-th sub frame contains the CSI RS to the macro terminal 120 using a PCFICH channel of the n-th sub frame.

Since the relay 130 is not able to receive the PCFICH channel, the base station 110 may transmit the information on whether the (n+k)-th sub frame contains the CSI RS to the relay 130 using a dedicated channel for the relay 130. According to an embodiment, the dedicated channel may be located next to a symbol used for PDCCH transmission and for a transition gap.

According to an embodiment, the base station 110 may transmit the n-th sub frame including the value 'k.' That is, the base station 110 informs the macro terminal 120 or the relay 130 that the CSI RS is transmitted to the (n+k)-th sub frame.

Since the relay 130 is capable of receiving only part of the sub frames transmitted by the base station 110, the relay 130 is not able to receive the CSI RS pattern information being transmitted by the base station 110 to the macro terminal 120. The base station 110 may transmit the CSI RS pattern information to the relay 130 using the dedicated channel for the relay 130. The dedicated channel may be a CCH relay or a downlink shared channel for the relay 130.

The base station 110 transmits the CSI RS only in a part of the sub frames. The relay 130 may estimate the CSI RS only in a part of the sub frames. Therefore, the relay 130 is able to receive the CSI RS only when the sub frame where the base station 110 transmits the CSI RS corresponds to the sub frame where the relay 130 receives the signal of the base station 110. The relay 130 is not able to receive the CSI RS when those sub frames do not correspond to each other.

Figure 6:
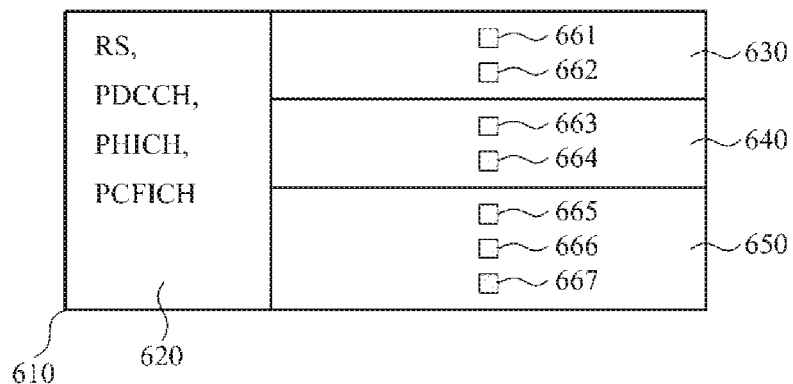
FIG. 6 is a view showing an RS located in a frequency range according to an embodiment.

FIG. 6 shows the CSI RS located in a frequency range, according to an embodiment of the present invention. The base station 110 transmits the CSI RS to the sub frame allocated to the link between the base station 110 and the relay 130. The base station may be contained in all the sub frames allocated to the link between the base station 110 and the relay 130 or part of the sub frames.

FIG. 6 shows the embodiment where CSI RSs 661, 662, 663, 664, 665, 666, and 667 are present in all frequency ranges 630, 640, and 650 of a sub frame 610.

Figure 7:
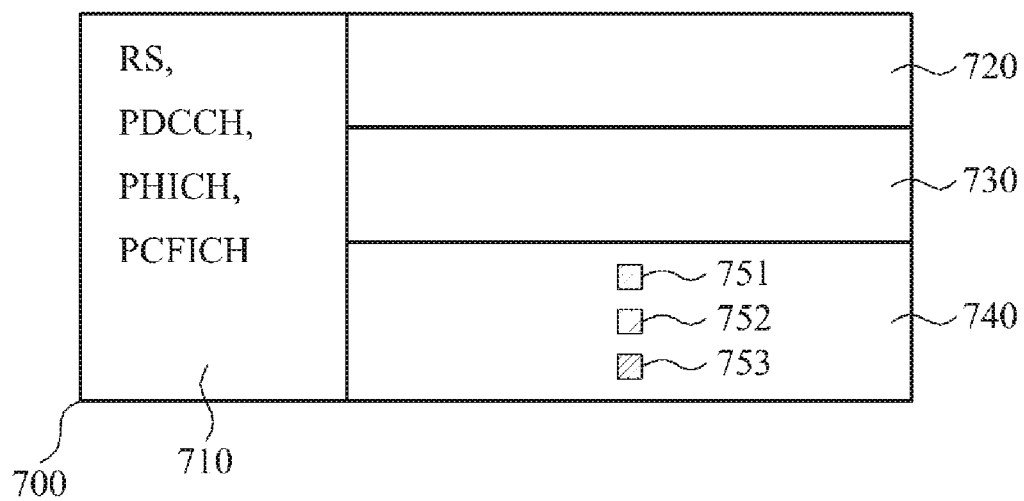
FIG. 7 is a view showing an RS located in a frequency range according to another embodiment.

FIG. 7 shows the CSI RS present in a frequency range, according to another embodiment. According to the embodiment shown in FIG. 7, CSI RSs 751, 751, and 753 are present in only a frequency range 740 allocated to the relay 130 but not in other frequency ranges 720 and 730.

According to an embodiment, the base station 110 may transmit the CSI RS to a plurality of relays. In this case, a frequency range may be individually allocated to each of the relays. The base station 110 may allocate the CSI RS to a union of all the frequency ranges respectively allocated for data transmission to the relays.

According to an embodiment, the base station 110 may allocate the CSI RS not only to the union of the all frequency ranges allocated for data transmission to the relays but also to the frequency range allocated for data transmission to the macro terminal.

Figure 8:
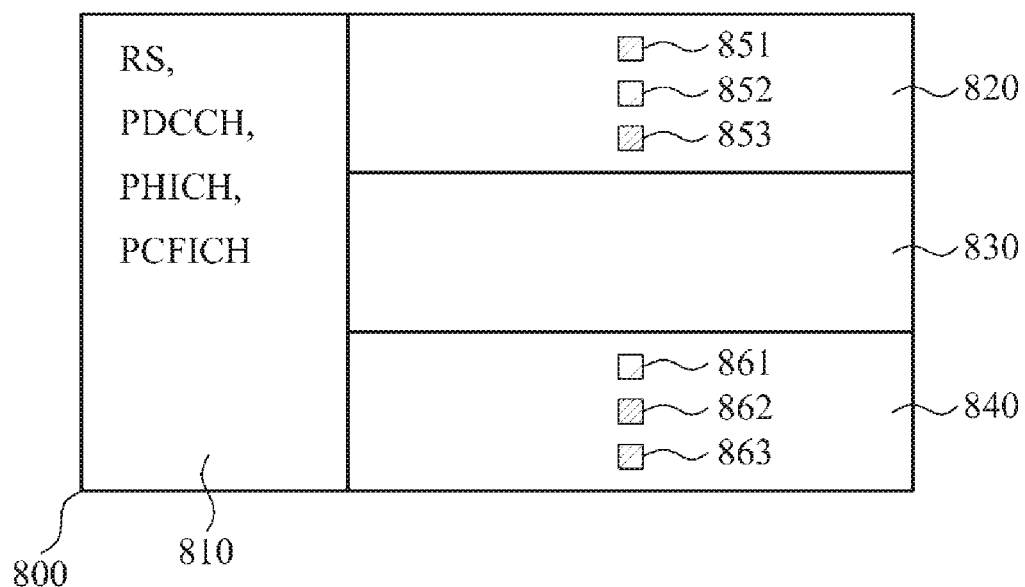
FIG. 8 is a view showing an RS located in a frequency range according to still another embodiment.

FIG. 8 shows the CSI RS present in a frequency range, according to still another embodiment. In the embodiment shown in FIG. 8, the base station 110 may allocate the CSI RS only to part of frequency ranges of a downlink resource. In this case, different frequency ranges instead of all the same frequency range may be used in the all sub frames transmitting the CSI RS. In this case, the base station 110 may inform the relay 130 of which frequency range has the CSI RS.

Figure 9:
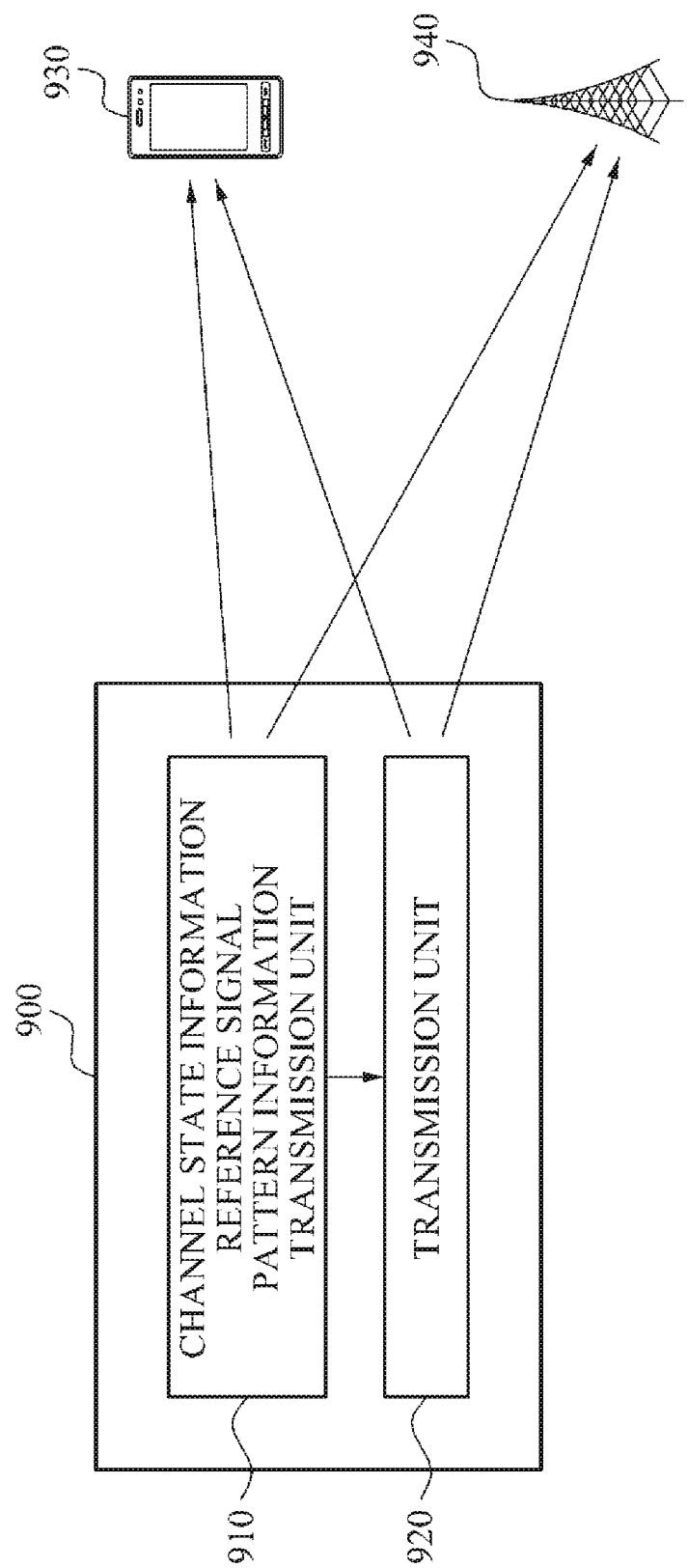
FIG. 9 is a block diagram showing the structure of the base station according to an embodiment of the present invention.

FIG. 9 is a block diagram showing the structure of a base station according to an embodiment of the present invention.

The base station 900 includes a CSI RS pattern information transmission unit 910 and a transmission unit 920.

The CSI RS pattern information transmission unit 910 transmits, to a macro terminal 930 or a relay 940, information on a sub frame containing the CSI RS among all the sub frames transmitted by the transmission unit 920. The macro terminal 930 receives data directly from the base station 900 by connecting with the base station 900.

According to an embodiment, the macro terminal 930 extracts CSI between the base station 900 and the macro terminal 930 and feeds back the extracted CSI to the base station 900.

According to an embodiment, the CSI RS pattern information may include at least one of an identifier list of the sub frame containing the CSI RS, the transmission period and offset of the sub frame containing the CSI RS, a bitmap with respect to the sub frame containing the CSI RS, and information on whether the CSI RS is present in a sub frame after a k-th sub frame.

According to an embodiment, the CSI RS pattern information may include position information on the sub frames set not to transmit the CSI RS regardless of a period.

According to an embodiment, the CSI RS pattern information may include the position information of the MBSFN sub frame set for the MBMS service.

According to an embodiment, the CSI RS pattern information may include position information of the downlink sub frame set for the data reception backhaul link.

According to an embodiment, the CSI RS pattern information or the information on the sub frame containing the CSI RS may be set to be the same or different with respect to a plurality of base stations.

According to an embodiment, the CSI RS pattern information transmission unit 910 may transmit the information on the sub frame containing the CSI RS to the macro terminal 930 through the CCH.

According to an embodiment, the CSI RS pattern information transmission unit 910 may transmit the information on the sub frame containing the CSI RS to the relay 940.

The transmission unit 920 transmits the CSI RS and data to the macro terminal 930 or the relay 940 with reference to the information on the sub frame. The transmission unit 920 may not transmit the CSI RS in the MBSFN sub frame set for the MBMS service.

The transmission unit 920 may not transmit the CSI RS in the downlink sub frame used for the data reception backhaul link.

The relay 940 extracts the CSI with respect to the base station 900 using the CSI RS.

Figure 10:
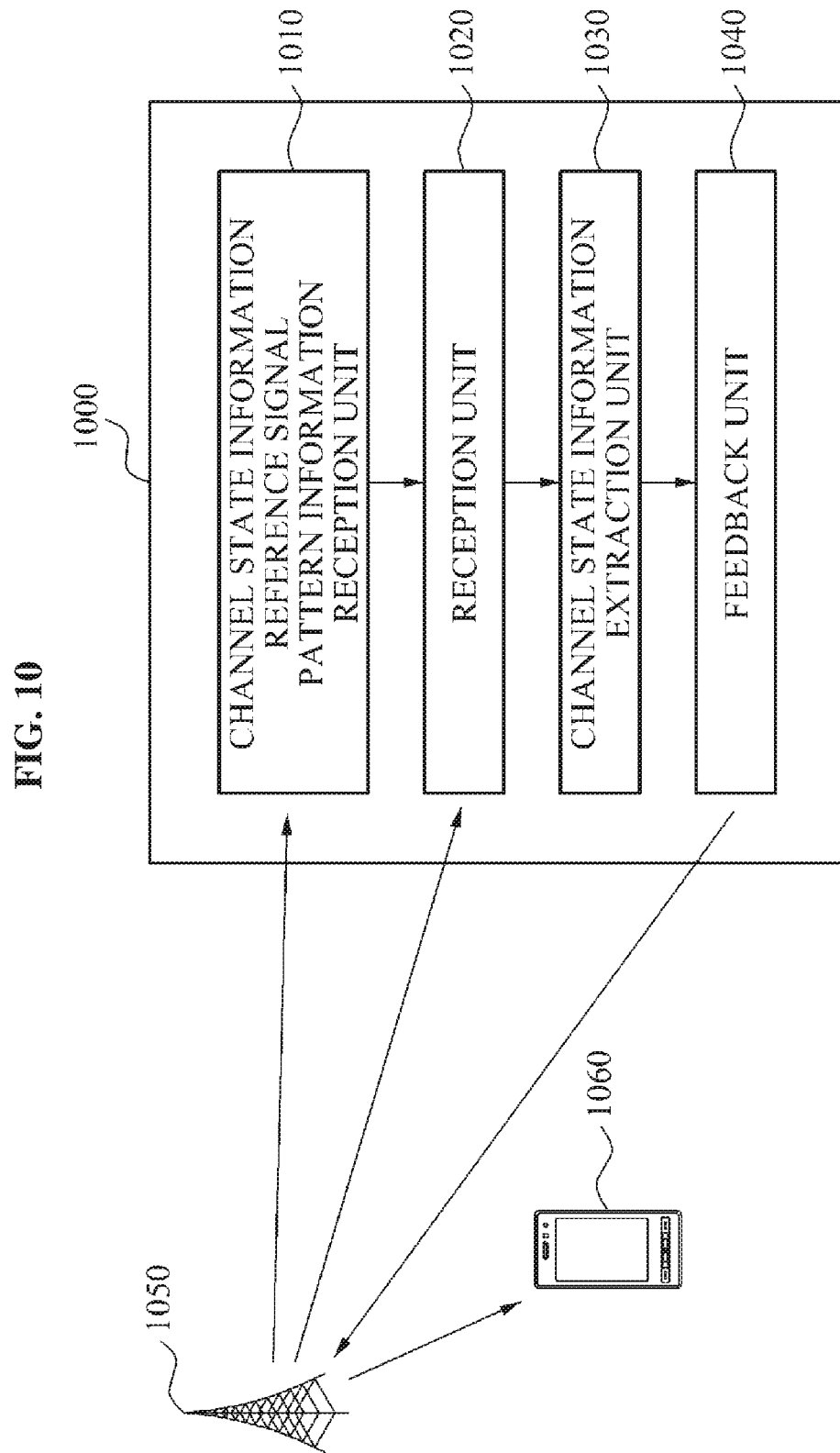
FIG. 10 is a block diagram showing the structure of the relay according to an embodiment of the present invention.

FIG. 10 is a block diagram showing the structure of a relay according to an embodiment of the present invention.

The relay 1000 includes a CSI RS pattern information reception unit 1010, a reception unit 1020, a CSI extraction unit 1030, and a feedback unit 1040.

A base station 1050 transmits the sub frame containing data to the information 1000. Part of the sub frames transmitted by the base station 1050 may contain the CSI RS.

The CSI RS pattern information reception unit 1010 receives the information on the sub frame containing the CSI RS from the base station 1050.

According to an embodiment, the CSI RS pattern information may include at least one of an identifier list of the sub frame containing the CSI RS, the transmission period and offset of the sub frame containing the CSI RS, a bitmap with respect to the sub frame containing the CSI RS, and information on whether the CSI RS is present in a sub frame after a k-th sub frame.

According to an embodiment, the CSI RS pattern information may include position information on the sub frames set not to transmit the CSI RS regardless of a period.

According to an embodiment, the CSI RS pattern information may include the position information of the MBSFN sub frame set for the MBMS service.

According to an embodiment, the CSI RS pattern information may include position information of the downlink sub frame set for the data reception backhaul link.

The reception unit 1020 receives the CSI RS from the base station 1050 using the information on sub frame.

The CSI extraction unit 1030 extracts the CSI between the base station 1050 and the relay 1000 using the CSI RS.

The feedback unit 1040 may feedback the extracted CSI to the base station 1050.

The base station 1050 may transmit data directly to a macro terminal 1060 connected with the base station 1050.

Figure 11:
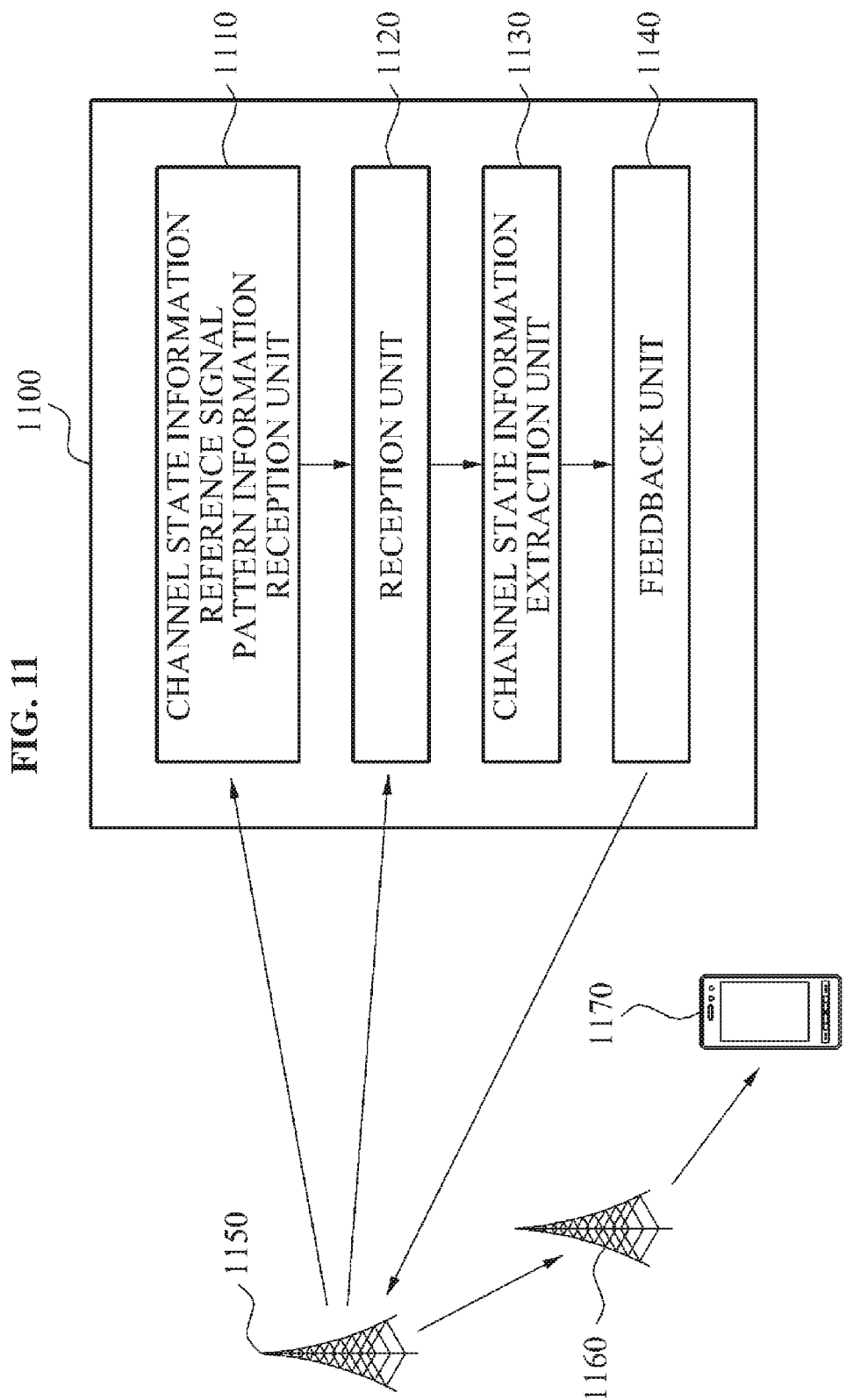
FIG. 11 is a block diagram showing the structure of a terminal according to an embodiment of the present invention.

FIG. 11 is a block diagram showing the structure of a terminal according to an embodiment of the present invention.

The terminal 1100 includes a CSI RS pattern information reception unit 1110, a reception unit 1120, a CSI extraction unit 1130, and a feedback unit 1140.

The CSI RS pattern information reception unit 1110 receives the information on the sub frame containing the CSI RS from the base station 1150.

According to an embodiment, the CSI RS pattern information may include at least one of an identifier list of the sub frame containing the CSI RS, the transmission period and offset of the sub frame containing the CSI RS, a bitmap with respect to the sub frame containing the CSI RS, and information on whether the CSI RS is present in a sub frame after a k-th sub frame.

According to an embodiment, the CSI RS pattern information may include position information on the sub frames set not to transmit the CSI RS regardless of a period.

According to an embodiment, the CSI RS pattern information may include the position information of the MBSFN sub frame set for the MBMS service.

According to an embodiment, the CSI RS pattern information may include position information of the downlink sub frame set for the data reception backhaul link.

According to an embodiment, the CSI RS pattern information reception unit 1110 may receive the information on the sub frame through the CCH.

The reception unit 1120 receives the CSI RS from the base station 1150 using the information on sub frame.

The CSI extraction unit 1130 extracts the CSI between the base station 1050 and the relay 1100 using the CSI RS.

The feedback unit 1140 may feedback the extracted CSI to the base station 1150.

The base station 1150 may transmit data directly to a macro terminal 1160 connected with the base station 1150. The relay 1160 may forward the data received from the base station 1150 to a relay terminal 1170 connected with the relay 1160.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for wireless communication, comprising:
   receiving, by a user equipment (UE), information related to downlink reference signals, wherein the information comprises a parameter used to determine candidate subframes;
   receiving, by the UE, information related to locations of a first set of candidate subframes that satisfy a first condition;
   receiving, by the UE, the downlink reference signals using a second set of candidate subframes that do not satisfy any of one or more predetermined conditions including the first condition, wherein a third set of candidate subframes, including the first set of candidate subframes, which satisfy any of the one or more predetermined conditions, including the first condition, do not comprise the downlink reference signals, wherein at least one of the first set of candidate subframes comprises a first portion for control information and a second portion for data, the second portion being subsequent to the first portion in time; and
   receiving, by the UE, data through the second portion for data of the at least one of the first set of candidate subframes.

2. The method of claim 1, wherein the parameter indicates a reception periodicity and an offset of the candidate subframes.

3. The method of claim 1, wherein the third set of candidate subframes comprise MBSFN (Multi-Broadcast Single-Frequency Network) subframes designated for a MBMS (Multimedia Broadcast Multicast Service) service.

4. The method of claim 1, wherein the downlink reference signals comprise Channel State Information reference signals (CSI-RS).

5. The method of claim 1, wherein the first portion for control information comprises Physical Downlink Control Channel (PDCCH), and the second portion for data comprises Physical Downlink Shared Channel (PDSCH).

6. The method of claim 1, wherein the third set of candidate subframes comprises special subframes.

7. A user equipment (UE), comprising:
   a circuitry, which is configured to:
      cause the UE to receive information related to downlink reference signals, wherein the information comprises a parameter used to determine candidate subframes;
      cause the UE to receive information related to locations of a first set of candidate subframes that satisfy a first condition;
      cause the UE to receive the downlink reference signals using a second set of candidate subframes that do not satisfy any of one or more predetermined conditions including the first condition, wherein a third set of candidate subframes, including the first set of candidate subframes, which satisfy any of the one or more predetermined conditions, including the first condition, do not comprise the downlink reference signals, wherein at least one of the first set of candidate subframes comprises a first portion for control information and a second portion for data, the second portion being subsequent to the first portion in time; and
      cause the UE to receive data through the second portion for data of the at least one of the first set of candidate subframes.

8. The UE of claim 7, wherein the parameter indicates a reception periodicity and an offset of the candidate subframes.

9. The UE of claim 7, wherein the third set of candidate subframes comprise MBSFN (Multi-Broadcast Single-Frequency Network) subframes designated for a MBMS (Multimedia Broadcast Multicast Service).

10. The UE of claim 7, wherein the downlink reference signals comprise Channel State Information reference signals (CSI-RS).

11. The UE of claim 7, wherein the first portion for control information comprises Physical Downlink Control Channel (PDCCH), and the second portion for data comprises Physical Downlink Shared Channel (PDSCH).

12. The UE of claim 7, wherein the third set of candidate subframes comprises special subframes.

13. A device for a user equipment (UE), the device comprising:
   a circuitry configured to:
      cause the UE to receive information related to downlink reference signals, wherein the information comprises a parameter used to determine candidate subframes;
      cause the UE to receive information related to locations of a first set of candidate subframes that satisfy a first condition;
      cause the UE to receive the downlink reference signals using a second set of candidate subframes that do not satisfy any of one or more predetermined conditions including the first condition, wherein a third set of candidate subframes, including the first set of candidate subframes, which satisfy any of the one or more predetermined conditions, including the first condition, do not comprise the downlink reference signals, wherein at least one of the first set of candidate subframes comprises a first portion for control information and a second portion for data, the second portion being subsequent to the first portion in time; and
      cause the UE to receive data through the second portion for data of the at least one of the first set of candidate subframes.

14. The device of claim 13, wherein the parameter indicates a reception periodicity and an offset of the candidate subframes.

15. The device of claim 13, wherein the third set of candidate subframes comprises MBSFN (Multi-Broadcast Single-Frequency Network) subframes designated for a MBMS (Multimedia Broadcast Multicast Service) service.

16. The device of claim 13, wherein the downlink reference signals comprise Channel State Information reference signals (CSI-RS).

17. The device of claim 13, wherein the first portion for control information comprises Physical Downlink Control Channel (PDCCH), and the second portion for data comprises Physical Downlink Shared Channel (PDSCH).

18. The device of claim 13, wherein the third set of candidate subframes comprises special subframes.

* * * * *